United States Patent
Kohut et al.

(10) Patent No.: US 6,554,318 B2
(45) Date of Patent: Apr. 29, 2003

(54) SEAT BELT TENSION SENSOR

(75) Inventors: George Rodney Kohut, Troy, MI (US); Joseph Y Yoon, Rochester Hills, MI (US); Morgan D. Murphy, Kokomo, IN (US); David L Hartley, Shelby Township, MI (US); David B Purdie, Itasca, IL (US)

(73) Assignee: Delphi Technologies, Inc., Troy, MI (US)

( * ) Notice: Subject to any disclaimer, the term of this patent is extended or adjusted under 35 U.S.C. 154(b) by 4 days.

(21) Appl. No.: 09/796,237

(22) Filed: Feb. 28, 2001

(65) Prior Publication Data

US 2001/0042981 A1 Nov. 22, 2001

Related U.S. Application Data

(63) Continuation-in-part of application No. 09/482,298, filed on Jan. 12, 2000.
(60) Provisional application No. 60/218,606, filed on Jul. 17, 2000, and provisional application No. 60/248,997, filed on Nov. 15, 2000.

(51) Int. Cl.$^7$ ............................................ B60R 22/48
(52) U.S. Cl. ..................... 280/801.1; 280/735; 180/268
(58) Field of Search .......................... 180/268; 280/735, 280/801.1; 73/826, 862.69

(56) References Cited

U.S. PATENT DOCUMENTS

| 3,618,378 A | 11/1971 | Shull et al. |
| 3,784,972 A | 1/1974 | Hults |
| 3,817,093 A | 6/1974 | Williams |
| 3,868,662 A | 2/1975 | Russell, Jr. |
| 4,052,775 A | 10/1977 | Gavagan et al. |
| 4,424,509 A | 1/1984 | Andres et al. |
| 4,574,911 A | 3/1986 | North |
| 4,677,861 A | 7/1987 | Bartholomew |
| 4,742,886 A | 5/1988 | Sato |
| 4,805,467 A | 2/1989 | Bartholomew |
| 4,943,087 A | 7/1990 | Sasaki |
| 4,979,400 A | 12/1990 | Bartholomew |
| 5,060,977 A | 10/1991 | Saito |
| 5,087,075 A | 2/1992 | Hamaue |

(List continued on next page.)

FOREIGN PATENT DOCUMENTS

WO    WO 99/55559    11/1999

OTHER PUBLICATIONS

"Magnetic Field Sensors for Magnetic Position Sensing in Automotive Applications", Joseph P. Heremans, General Motors Research and Development Corporation, Apr. 1, 1997.

Primary Examiner—Lesley D. Morris
Assistant Examiner—Paul Royal
(74) Attorney, Agent, or Firm—Kathryn A. Marra

(57) ABSTRACT

A seat belt tension sensing assembly fixedly secured to a vehicle. The seat belt tension sensing assembly has a housing and a slider slidably received within the housing, the slider being capable of movement between a first position and a second position within the housing, the second position corresponding to a tension in the seat belt consummate with a child safety seat being secured by the seat belt, the slider having a first opening for a portion of the seat belt to pass therethrough. A first magnet and a second magnet are secured in a second opening in the slider, the first and second magnet being in a facing spaced relationship. A Hall effect device is fixedly secured to the housing and protrudes into the second opening of the slider. The Hall effect device is closer to the first magnet when the slider is in the first position and the Hall effect device is closer to the second magnet when the slider is in the second position. The Hall effect device provides a signal to an air bag controller, and a biasing member provides an urging force to the slider, the urging force urging the slider into the first position.

29 Claims, 7 Drawing Sheets

U.S. PATENT DOCUMENTS

| | | | |
|---|---|---|---|
| 5,133,425 A | 7/1992 | Han | |
| 5,181,739 A | 1/1993 | Bauer et al. | |
| 5,181,773 A | 1/1993 | Colvin | |
| 5,309,135 A | 5/1994 | Langford | |
| 5,364,129 A | 11/1994 | Collins et al. | |
| 5,454,591 A | 10/1995 | Mazur et al. | 280/735 |
| 5,494,311 A | 2/1996 | Blackburn et al. | |
| 5,570,903 A | 11/1996 | Meister et al. | |
| 5,570,932 A | 11/1996 | Collins et al. | |
| 5,583,476 A | 12/1996 | Langford | |
| 5,590,904 A | 1/1997 | Ellis et al. | |
| 5,605,348 A | 2/1997 | Blackburn et al. | |
| 5,618,056 A | 4/1997 | Schoos et al. | |
| 5,636,864 A | 6/1997 | Hori | |
| 5,728,953 A | 3/1998 | Beus et al. | |
| 5,732,974 A | 3/1998 | Sayles | |
| 5,775,618 A | 7/1998 | Krambeck | |
| 5,831,172 A | 11/1998 | Kidd | |
| 5,871,232 A | 2/1999 | White | 280/735 |
| 5,960,523 A | 10/1999 | Husby et al. | |
| 5,965,827 A | 10/1999 | Stanley et al. | |
| 5,996,421 A | 12/1999 | Husby | |
| 6,081,759 A | 6/2000 | Husby et al. | |
| 6,161,439 A | 12/2000 | Stanley | |
| 6,209,915 B1 | 4/2001 | Blakesley | |
| 6,230,088 B1 | 5/2001 | Husby | |
| 6,301,977 B1 * | 10/2001 | Stojanovski | 73/862.393 |
| 6,336,371 B1 * | 1/2002 | O'Boyle | 73/865.9 |
| 6,363,793 B2 * | 4/2002 | O'Boyle | 73/828 |

* cited by examiner

FIG. 3
FIG. 4
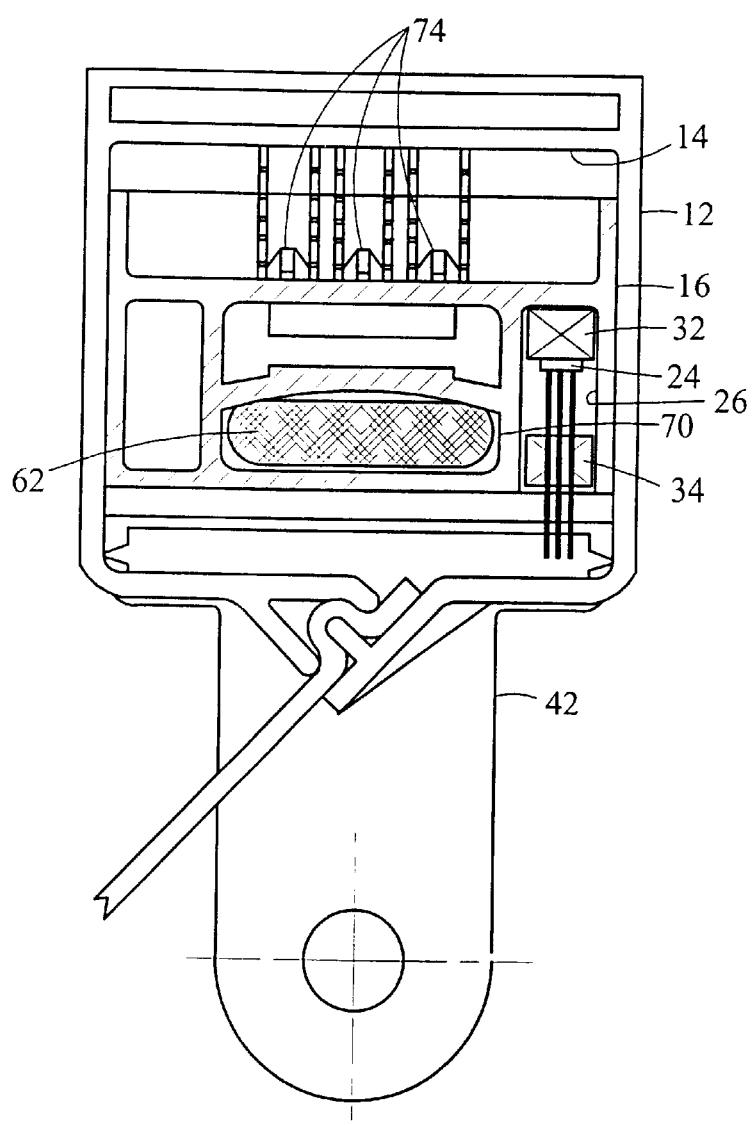
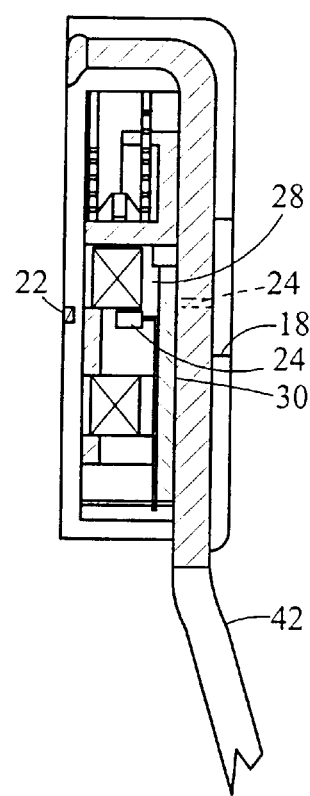

SEAT BELT TENSION SENSOR

CROSS REFERENCE TO RELATED APPLICATIONS

This application claims the benefit of Provisional application, No. 60/218,606, filed Jul. 17, 2000, the contents of which are incorporated herein by reference thereto.

This application is a Continuation-In-Part of U.S. patent application, Ser. No. 09/482,298, filed Jan. 12, 2000, the contents of which are incorporated herein by reference thereto.

This is also related to Provisional application, No. 60/248,997, filed Nov. 15, 2000, the contents of which are incorporated herein by reference thereto.

TECHNICAL FIELD

This application relates to tension sensors, and in particular, a seat belt tension sensor.

BACKGROUND

Vehicular air bags play an important role in restraining a seat occupant in vehicular crash situations. However, and in some applications, it may be desirable to suppress the deployment of an air bag. In addition, the deployment of an air bag corresponding to an unoccupied seat represents an unnecessary repair expense.

Vehicles are provided with seat restraint systems such as a seat belt in order to restrain an occupant in a seat of the vehicle. In some vehicles, the seat restraint system may be a lap belt, a shoulder belt, or both. Occasionally, the lap belt and shoulder belt are connected together at one end. The seat restraint system includes a latch plate at the connected end. The seat restraint system also includes a buckle connected at one end by webbing or the like to the vehicle structure. The buckle receives the latch plate to be buckled together. When the buckle and latch plate are buckled together, the seat restraint system restrains movement of the occupant to help protect the occupant during a collision.

Some inflatable restraint systems want input information as to the occupancy of the vehicle seat. Deployment of the inflatable restraint may partially depend on information supplied by sensors in the seat, such as a sensor that would determine the weight of an object in the seat.

When a child seat is placed in the seat and cinched down, the sensors may need a way to distinguish between a large mass and a child seat. Typically, when a child seat is used, there will be high tension in the seat restraint system. Comfort studies have typically shown that a human occupant would not wear their seat restraint that tightly. Readings on seat restraint tension can help to decide the deployment characteristics of the inflatable restraint.

Thus, it may be desirable under certain conditions to provide information to a control module to help to determine the difference between a child seat or an occupant.

SUMMARY OF INVENTION

A method and apparatus for detecting the tension in a seat belt. The detected tension corresponding to a tension consummate with a tension created when a child safety seat is secured by the seat belt. The sensor then produces a signal which instructs a controller to suppress the deployment of an air bag.

The above-described and other features and advantages of the present invention will be appreciated and understood by those skilled in the art from the following detailed description, drawings, and appended claims.

BRIEF DESCRIPTION OF THE DRAWINGS

FIG. 3 is a cross sectional view of a seat belt tension assembly without tension;

FIG. 4 is a view along lines 4—4 of FIG. 3;

DETAILED DESCRIPTION OF THE PREFERRED EMBODIMENTS

Referring now to FIGS. 1–4, a first embodiment of a seat belt tension sensor is shown generally at 10. Seat belt tension sensor 10 includes an analog sensor design, which will produce a signal relative to the variation in the tension of the seat belt. Seat belt tension sensor 10 has a housing portion 12. Housing portion 12 is preferably constructed out of a lightweight, easily-molded material such as plastic. Housing 12 has a central receiving area 14. A slider 16 is configured to be slidably received within central receiving area 14.

Figure 1:
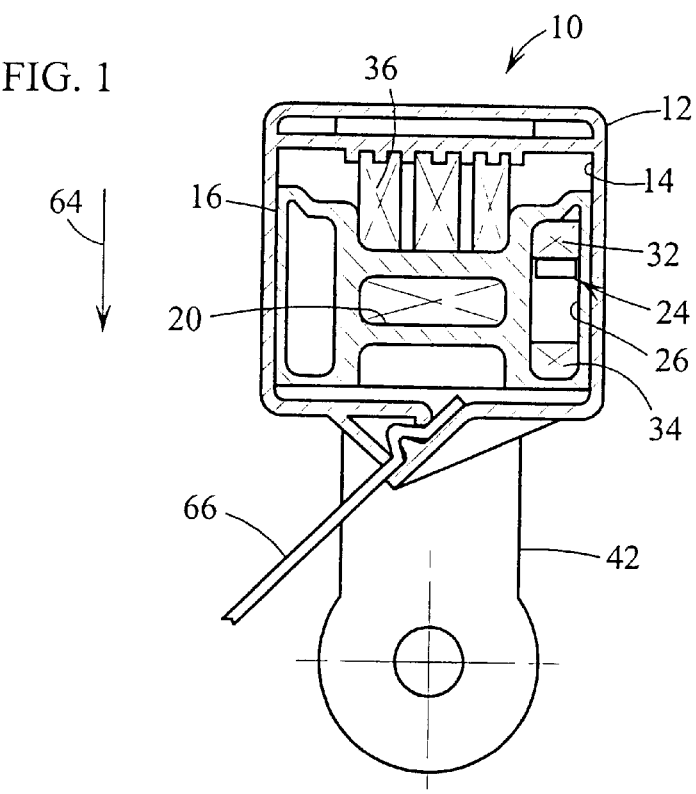
FIG. 1 is a cross sectional view of a seat belt tension assembly without tension.
Figure 2:
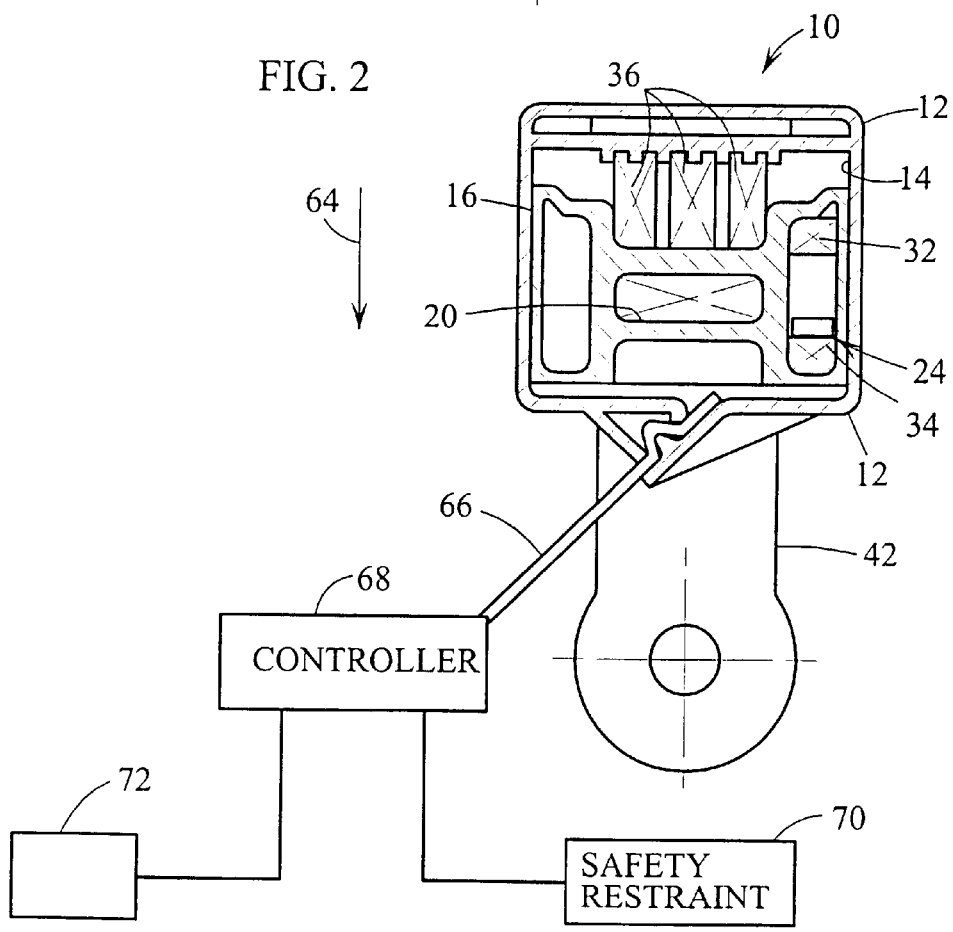
FIG. 2 is a cross sectional view of the seat belt tension of a FIG. 1 assembly with tension.

The dimensions of slider 16 are such that the same is capable of movement in a range defined by a first position (FIG. 1) and a second position (FIG. 2). The first position corresponds to little or no tension, and the second position corresponds to a tension greater than or equal to a pre-determined tension. The pre-determined tension relates to a tension value that will determine whether or not a child seat is cinched by the seat belt.

Housing 12 has an opening 18. In addition, slider 16 has an opening 20. Opening 18 is larger than opening 20, allowing opening 20 to traverse within opening 18 as slider moves within the range defined by the first position and the second position. In addition, slider 16 has a pair of tab portions 22 which protrude outwardly from the surface of slider 16 proximate to opening 20.

A sensor 24 is also positioned within receiving area 14. In an exemplary embodiment, sensor 24 is a Hall effect sensor assembly. Hall effect sensor assembly 24 includes a Hall effect device and complimentary circuit board 25. An opening 26 is disposed on slider 16. Opening 26 is substantially large enough to allow slider 16 to move within the range defined by the first position and the second position, while Hall effect sensor assembly 24 remains stationary. In addition, slider 16 is configured to have a shoulder portion 28. Shoulder portion 28 is configured to accommodate a baseplate 30 to which Hall effect sensor 24 and related electrical components are secured. As illustrated in FIGS. 1–4, Hall effect sensor 24 depends outwardly from baseplate 30. Accordingly, the securement of Hall effect sensor 24 within receiving area 14 will not impede the travel of slider 6.

A pair of magnets 32 and 34 are positioned at either end of opening 26. Accordingly, and as slider moves in the range defined by the first position (FIG. 1) and the second position (FIG. 2), hall effect sensor 24 moves away from magnet 32 and travels toward magnet 34.

The Hall effect device will sense the strength of the magnetic field of the approaching magnet (either magnet 32 or magnet 34, depending on the direction of travel), and depending on the strength of the magnetic field, the Hall effect device will generate an electric signal to determine the level of the tension force, the electric signal being received by a system controller to determine whether or not to suppress any safety-related items such as a hyper-tensioner, airbag, or pre-tensioner, etc. When the tension force exceeds the predetermined threshold, the system will suppress a passenger air bag. The analog design will provide a liner output, corresponding to seat belt tension, to the controller.

In an exemplary embodiment, the Vcc of the Hall effect sensor assembly 24 is 5 volts +/−0.5 volts DC. The voltage with no magnetic field present will be approximately 2.5 v. As the magnet is brought into the proximity of the sensor, the voltage will increase to near Vcc or decrease to near ground, depending on the polarity of the magnet. Accordingly, as the voltage increases or decreases, so does the tension of the seat belt. Of course, Vcc may have values greater than and less than 5 volts.

A biasing force for urging slider 16 in the direction of the first position (FIG. 1) is provided by a plurality of springs 36. Plurality of springs 36 are configured to be received within a plurality of spring apertures 38 in slider 16 at one end, and make contact with a wall 40 of receiving area 14. In an exemplary embodiment, three springs are used, and as applications may require, the number, size, and configuration of springs 36 may vary.

Once the internal components of sensor 10 are assembled, an anchor plate 42 is secured to housing 12. In an exemplary embodiment, anchor plate 42 is manufactured out of a durable material such as steel. Anchor plate 42 has an opening 44 which aligns with opening 18 of housing 12 when anchor plate 42 is secured to housing 12. Opening 44 is substantially similar to opening 18 of housing 14, thus allowing the travel of opening 20 within openings 44 and 18.

Anchorplate 42 has a securement end 46 which is configured to engage a shoulder portion 48 of housing 12. In addition, anchor plate 42 has a securement opening 50, positioned to engage a securement tab 52 of housing 12. A securement tab 52 is molded into housing 14 and includes a chamfered engagement surface 54 and an engagement surface 56. Accordingly, and since securement tab 52 is molded out of the same material of housing 14, securement tab 52 has resilient qualities which allow it to have a snap fit engagement of anchor plate 42 to housing 12. Accordingly, seat belt tension sensor 10 is easily assembled by snapping anchor portion 42 to housing 12. Accordingly, there are no additional manufacturing steps.

Anchor plate 42 has a securement portion 58 which depends away from housing 14 when anchor plate 42 is secured to the same. Securement portion 58 has an opening 60 which allows a securement bolt to pass therethrough in order to secure sensor assembly 10 to a vehicle.

Referring now to FIGS. 1–4, and as sensor assembly 10 is fixedly secured to a vehicle, a portion of a seat belt 62 passes through openings 18, 20, and 44. Referring now to FIGS. 1 and 2, a plurality of springs 36 provide an urging force in the direction of arrow 64 to maintain slider in the position illustrated in FIG. 1. In an exemplary embodiment, the biasing force of springs 36 is overcome when a force in the amount of 5 to 15 lbs is applied in the direction substantially opposite of arrow 64. Of course, and as applications may require, the biasing force of springs 36 to be overcome may vary. For example the biasing force of springs 36 may be greater or less than 15 lbs, this can be varied to comply with a manufacturing request for a different biasing force. Accordingly, and when the urging force of springs 36 is overcome, slider 16 travels towards the position illustrated in FIG. 2. In so doing, magnet 32 is moved away from the Hall effect sensor and magnet 34 is moved closer to the Hall effect sensor, causing a resulting signal to be sent through one of a plurality of wires 66 secured to Hall effect sensor 24.

The signal is ultimately received by a microcontroller 68 which controls the operation of an occupant protection system(s) 70 such as an airbag or other safety restraint system. The microcontroller will suppress the air bag and provide a signal to an indicator light 72 to indicate that the air bag has been suppressed. Indicator light 72 is located in a position within the vehicle compartment that is easily viewed by the operator and/or occupants of the same. For example, one such location of indicator light 72 is on the vehicle dashboard. In addition, the microcontroller may also provide an audible tone or voice response, indicating that the air bag has been suppressed.

Figure 6:
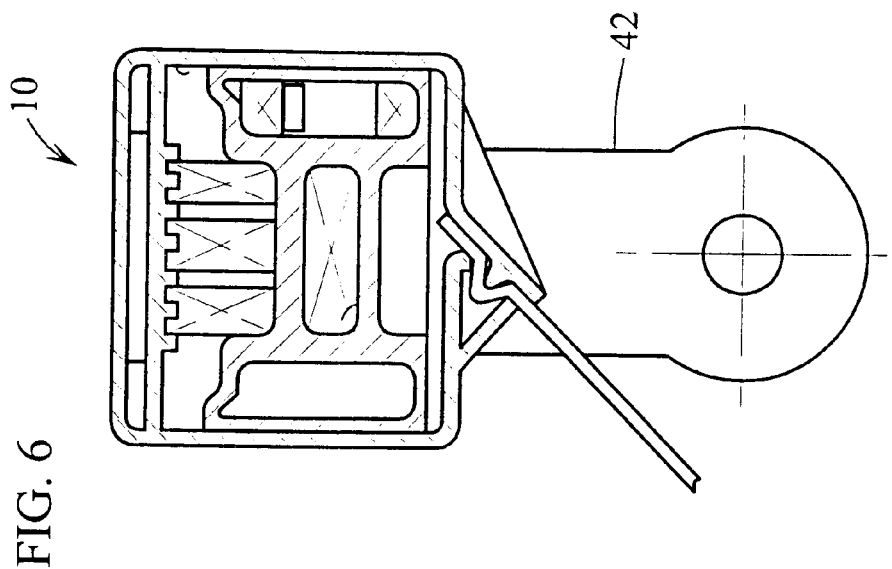
FIGS. 5 and 6 are cross sectional views of alternative seat belt tension assemblies.
Figure 5:
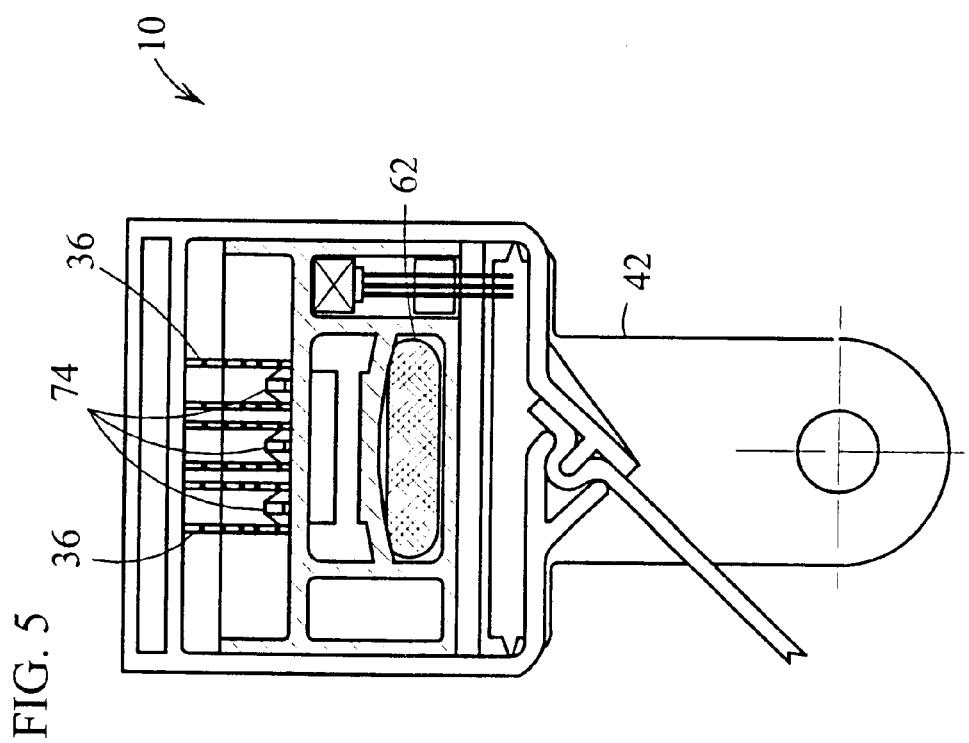

Referring now to FIGS. 5 and 6, alternative design configurations of sensor 10 are illustrated. In FIG. 5, a plurality of protrusions 74 are positioned to receive one end of springs 36. In FIG. 6, springs 36 are received within a central spring aperture 38. In addition, securement end 46 of anchor plate 42 can be configured to have an angular displacement with respect to anchor plate 42 (FIG. 5). Alternatively, securement end 46 of anchor plate 42 depends outwardly from the same.

Figure 7:
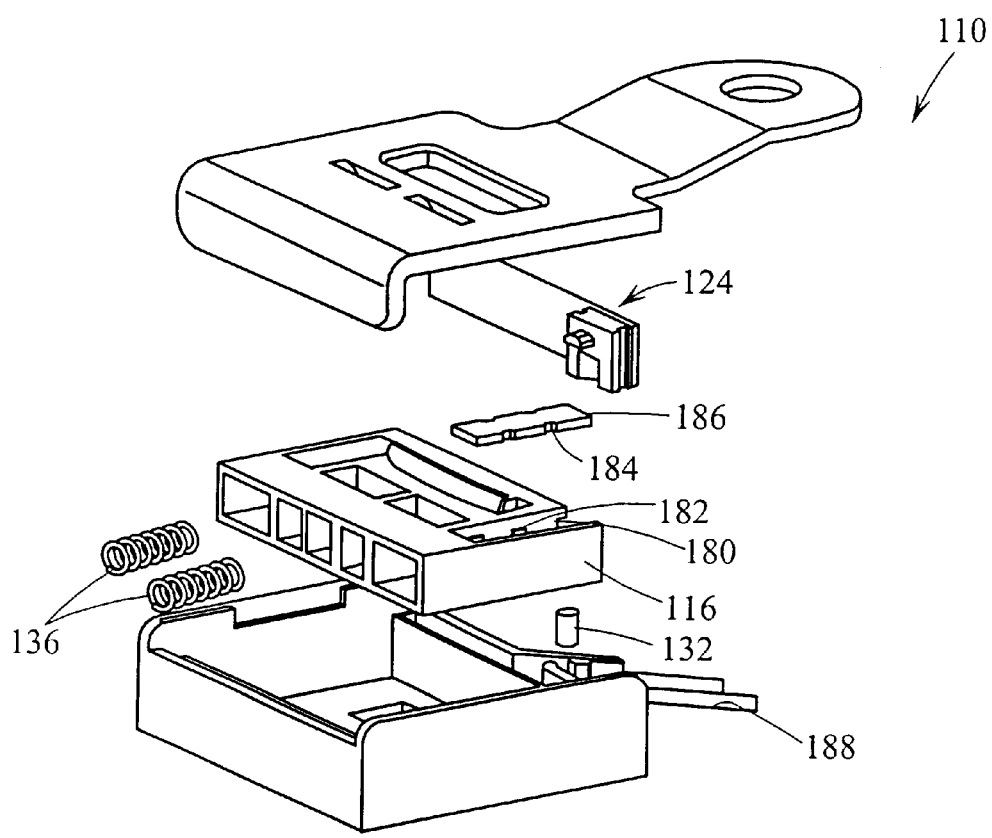
FIGS. 7 and 8 are exploded views of alternative embodiments of the present invention.
Figure 8:
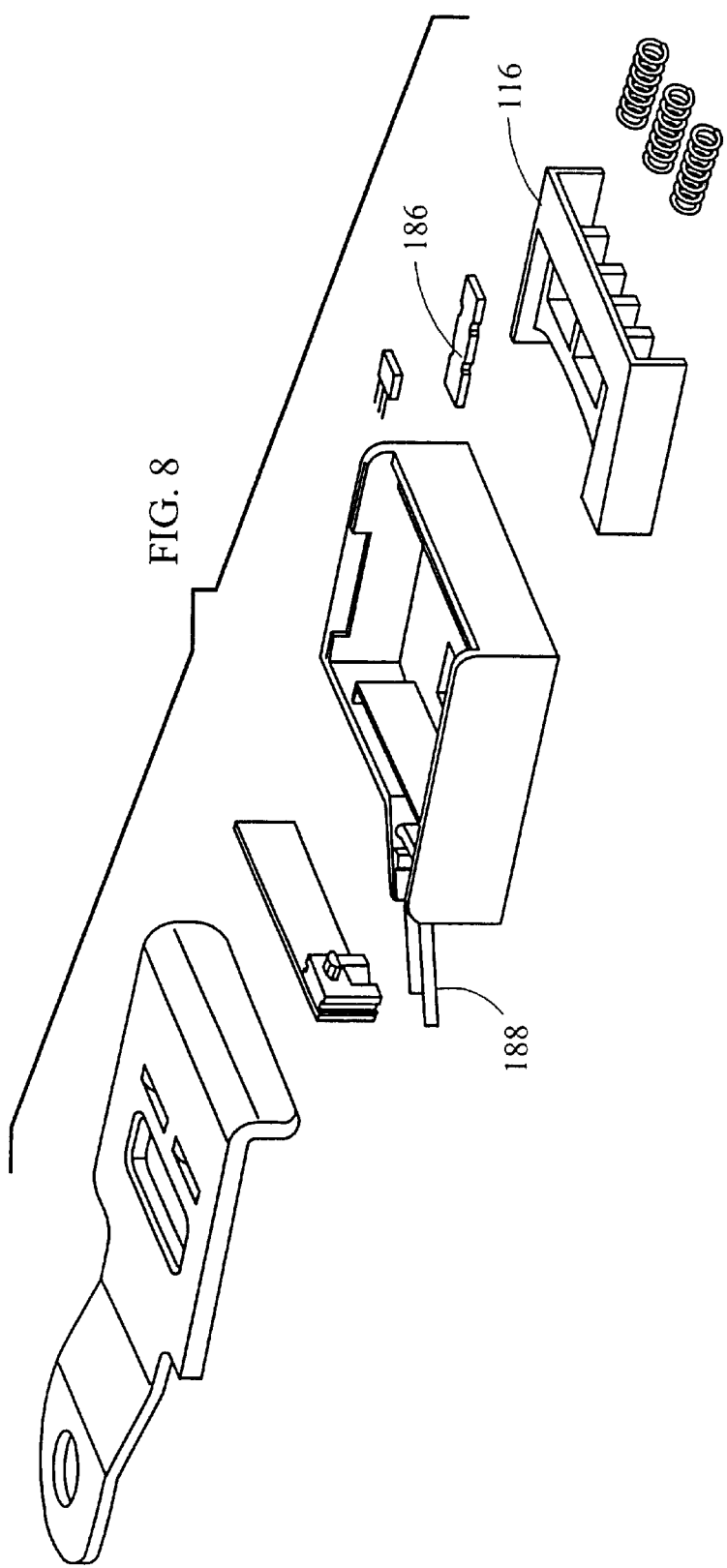
Figure 9:
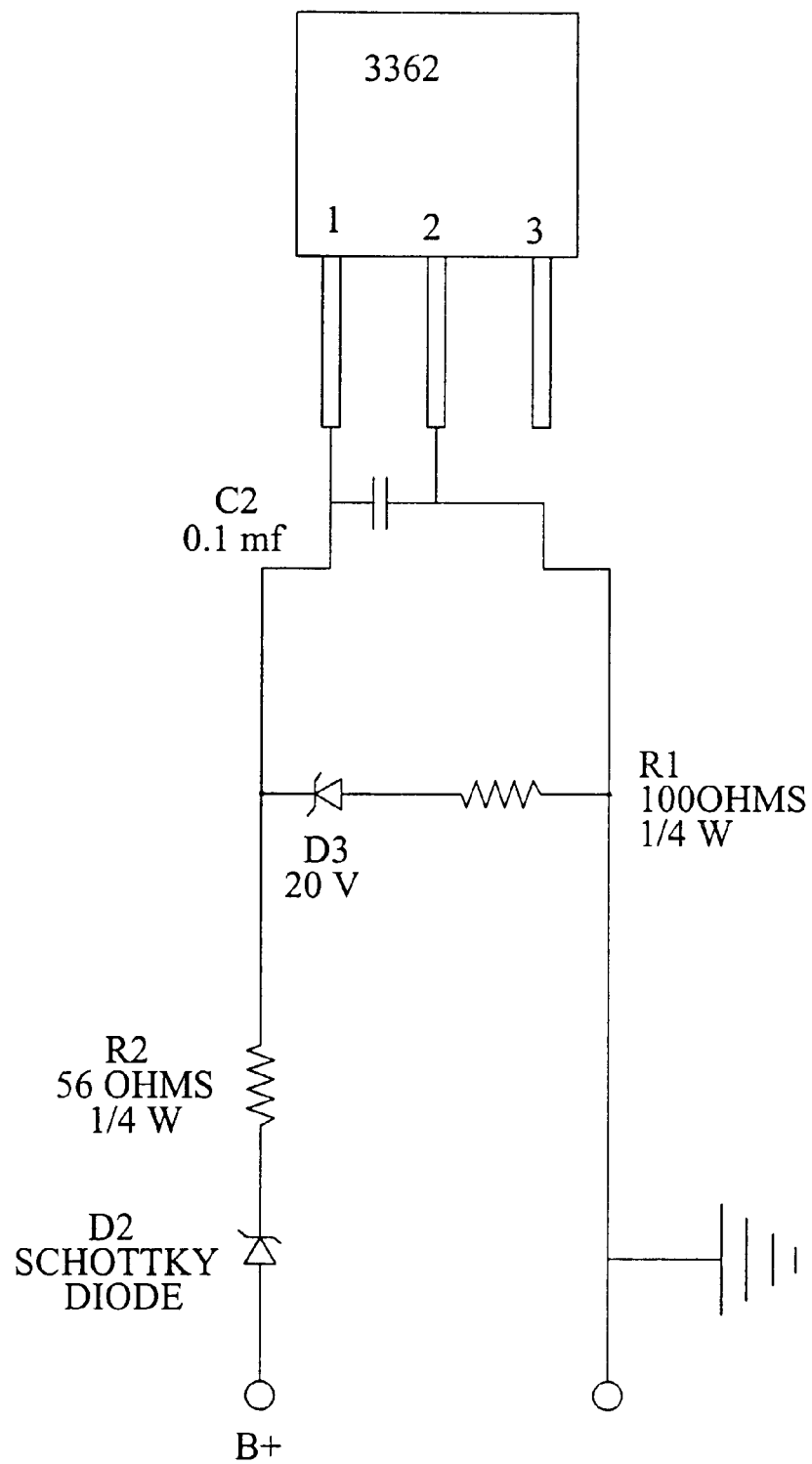
FIG. 9 is a schematic of a Hall effect device for use with the present invention.
Figure 10:
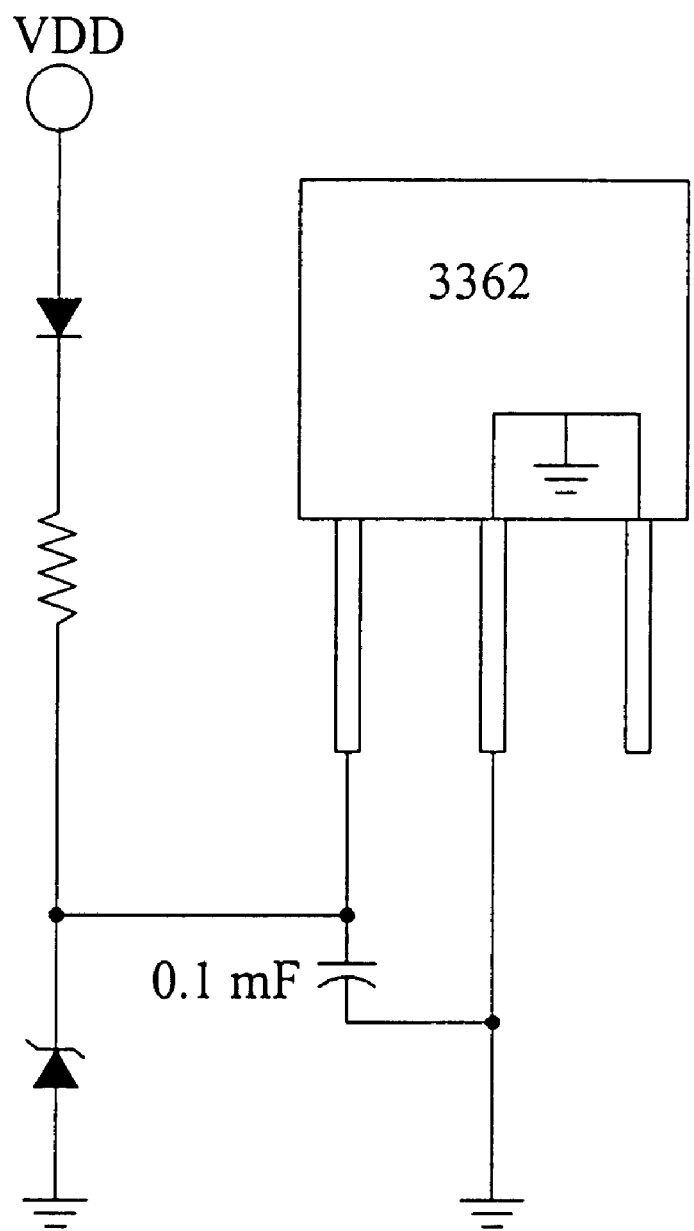
FIG. 10 is a schematic of a Hall effect device for use with the present invention.

Referring now to FIGS. 7 and 8, an alternative embodiment of the present invention is illustrated. Here, component parts performing similar or analogous functions are labeled in multiples of 100. Here, seat belt tension sensor 110 is a digital sensor design. This design is configured to provide an On-Off signal to the controller in order to suppress the safety device.

Here, slider 116 is configured to have a receiving area 180 having a plurality of tabs 182 for engaging notches 184 in a shutter 186. Shutter 186 is a planar member constructed out of a metal capable of shunting the magnetic field generated by a magnet 132.

In this embodiment, a single magnet 132 is positioned to be sensed by a Hall effect sensor assembly 124. Accordingly, and as slider 116 is urged by the tension of the seat belt passing through seat belt tension sensor 110, shutter 186 is moved away from its shunting position in between the hall effect sensor and the magnet. The movement of shutter 186 away from magnet 132 is detected by Hall effect sensor assembly 124 and a signal is sent out to a microcontroller via wires 188.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A seat belt tension sensing assembly comprising:
a) a housing;
b) a slider slidably received within said housing, said slider being capable of movement between a first position and a second position within said housing, said slider having a first opening for allowing a portion of a seat belt to pass therethrough, said housing having a second opening;
c) a first magnet and a second magnet being secured in said second opening in said slider;
d) a Hall effect device being fixedly secured to said housing and protruding into said second opening of said slider, said Hall effect device being closer to said first magnet when said slider is in said first position, and said Hall effect device being closer to said second magnet when said slider is in said second position, said Hall effect device providing a signal corresponding to the position of said slider as said seat belt tension increases; and
e) a biasing member for providing an urging force to said slider to urge said slider into said first position.

2. A seat belt tension sensing assembly comprising:
a housing;
a slider slidably received within said housing, said slider being capable of movement between a first position and a second position within said housing, said slider having a first opening for allowing a portion of a seat belt to pass therethrough;
at least one magnet operatively supported by said slider to generate a magnetic field;
a sensor to sense a strength of the magnetic field corresponding to a position of said slider with respect to said housing and providing a signal thereof;
a controller for receiving said signal, said controller suppressing a vehicle safety device if said signal meets or exceeds a threshold value; and
a biasing member for providing an urging force to said slider to urge said slider into said first position.

3. A seat belt tension sensing assembly as set forth in claim 2 wherein said sensor provides a discrete signal.

4. A seat belt tension sensing assembly as set forth in claim 2 wherein said sensor provides a linear signal.

5. A seat belt tension sensing assembly comprising:
a housing;
a slider slidably received within said housing, said slider being capable of movement between a first position and a second position within said housing, said slider having a first opening for allowing a portion of a seat belt to pass therethrough;
a sensor providing a signal corresponding to a position of said slider with respect to said housing;
a controller for receiving said signal, said controller suppressing a vehicle safety device if said signal meets or exceeds a threshold value;
a biasing member for providing an urging force to said slider to urge said slider into said first position; and
wherein said sensor is a Hall effect device and said Hall effect device provides a signal to said controller.

6. A seat belt tension sensing assembly as set forth in claim 2 wherein said biasing member is a plurality of springs.

7. A seat belt tension sensing assembly as set forth in claim 2 further comprising an anchor plate adapted to be fixedly secured to a portion of a vehicle and said housing being secured to said anchor plate.

8. A seat belt tension sensing assembly comprising:
a housing;
a slider slidably received within said housing, said slider being capable of movement between a first position and a second position within said housing, said slider having a first opening for allowing a portion of a seat belt to pass therethrough;
a sensor providing a signal corresponding to a position of said slider with respect to said housing;
a controller for receiving said signal, said controller suppressing a vehicle safety device if said signal meets or exceeds a threshold value;
a biasing member for providing an urging force to said slider to urge said slider into said first position;
an anchor plate adapted to be fixedly secured to a portion of a vehicle and said housing being secured to said anchor plate; and
wherein said anchor plate and said housing each have a second opening aligning with each other, said second openings being configured, dimensioned, and positioned to allow a portion of said second openings to align with said first opening of said slider as said slider moves from said first position to said second position.

9. A seat belt tension sensing assembly comprising:
a) a housing;
b) a slider slidably received within said housing, said slider being capable of movement between a first position and a second position within said housing, said slider having a first opening for allowing a portion of a seat belt to pass therethrough;
c) a magnet being secured to said housing;
d) a sensing device being fixedly secured to said housing and being in a facing relationship with respect to said magnet;
e) a shunting member being fixedly secured to said slider, said shunting member being disposed in between said sensing device and said magnet when said slider is in said first position, said shunting member being in a shunting position to shunt a magnetic field of said magnet when said slider is in said first position and said shunting member moves away from said shunting position as said slider moves towards said second position; and
f) a biasing member for providing an urging force to said slider to urge said slider into said first position.

10. A seat belt tension sensing assembly as set forth in claim 9 wherein said biasing member is a plurality of springs being in contact with said slider at one end and said housing at the other.

11. A seat belt tension sensing assembly as set forth in claim 9 wherein said shunting member is a steel plate.

12. A tension sensing assembly for use in a seat restraint system in a vehicle comprising:
a plate member for operative connection to a portion of the vehicle;
a housing operatively supported by said plate member;
a sliding member disposed in said housing for movement therein and cooperating with belt webbing;
a spring disposed in said housing for cooperating with said sliding member; and
a sensor disposed in said housing and cooperable with said sliding member to indicate a first tension level and a second tension level in the seat restraint system when said spring is deflected.

13. A tension sensing assembly as set forth in claim 12 wherein said sensor comprises a Hall effect device.

14. A method for suppressing a vehicle safety device, comprising:
   determining a threshold seat belt tension, the threshold seat belt tension corresponding to a child safety seat being secured by a seat belt;
   sensing a seat belt tension by monitoring a strength of a magnetic field corresponding to movement of a movable member of an anchor assembly of the seat belt, the movable member being biased in a non-tension position by a biasing member providing an urging force, the urging force corresponding to the threshold seat belt tension, the urging force being overcome when the seat belt tension overcomes the threshold seat belt tension; and
   providing a signal when the threshold seat belt tension has been overcome; and
   suppressing a vehicle safety device when the signal is received by a controller of the vehicle safety device.

15. A tension sensing assembly for a seat restraint system in a vehicle comprising:
   an anchor plate adapted to be secured to vehicle structure of the vehicle;
   a housing mounted to said anchor plate;
   a slider disposed in said housing for sliding movement therein and cooperating with belt webbing;
   a first magnet and a second magnet secured to said slider;
   at least one spring disposed between said slider and said housing for cooperating with said slider; and
   a Hall effect device disposed in said housing and cooperable with said slider to indicate a first tension level and a second tension level in the seat restraint system when said spring is deflected.

16. A tension sensing assembly as set forth in claim 15 wherein said slider has an opening to allow the belt webbing to extend therethrough, said slider including a lip extending outwardly adjacent said opening.

17. A tension sensing assembly as set forth in claim 16 wherein said opening has a closed loop perimeter to allow belt webbing to extend therethrough.

18. A tension sensing assembly as set forth in claim 15 wherein said slider has at least one opening to receive a portion of said at least one spring.

19. A tension sensing assembly as set forth in claim 15 wherein said housing has a portion overlapping said anchor plate.

20. A tension sensing assembly as set forth in claim 15 wherein said slider is made of plastic.

21. A tension sensing assembly as set forth in claim 15 wherein said housing is made of plastic.

22. A tension sensing assembly as set forth in claim 15 wherein said slider has at least one tab extending outwardly from a surface thereof.

23. A tension sensing assembly as set forth in claim 15 wherein said slider has a plurality of ribs.

24. A tension sensing assembly as set forth in claim 15 wherein said at least one spring is a compressible spring.

25. A tension sensing assembly as set forth in claim 15 wherein said slider has at least one protrusion to receive one end of said at least one spring.

26. A tension sensing assembly as set forth in claim 15 wherein said Hall effect device is programmable.

27. A tension sensing assembly as set forth in claim 15 wherein said first magnet and said second magnet are centered around said Hall effect device to produce a linear output.

28. A tension sensing assembly as set forth in claim 15 wherein said anchor plate has an opening extending therethrough, said opening having coined or chamfered edges.

29. A tension sensing assembly as set forth in claim 15 wherein said anchor plate has an end flange extending outwardly therefrom and overlapping said housing.

* * * * *